(12) United States Patent
You

(10) Patent No.: US 8,953,820 B2
(45) Date of Patent: Feb. 10, 2015

(54) METHOD AND APPARATUS FOR ADJUSTING VOLUME USING DISTANCE SENSORS

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 313 days.

(21) Appl. No.: 13/480,482

(22) Filed: May 25, 2012

(65) Prior Publication Data

US 2013/0230193 A1    Sep. 5, 2013

(30) Foreign Application Priority Data

Mar. 2, 2012 (CN) .......................... 2012 1 0052404

(51) Int. Cl.
*H03G 3/00* (2006.01)

(52) U.S. Cl.
USPC ........................................ 381/107; 455/550.1

(58) Field of Classification Search
CPC ............ H04M 2250/12; H04M 1/605; H04M 2250/22; H03G 3/301; H04S 2400/13; H04S 7/303; H04S 7/302; H04R 2430/01; H04R 2499/11; G06F 3/017; G06F 3/0304

USPC ......... 381/104, 105, 107, 109, 102, 334, 120; 455/567, 156.1, 550.1, 456.1; 340/686.1, 686.6; 250/336.1, 339.02; 707/700; 708/172

See application file for complete search history.

(56) References Cited

U.S. PATENT DOCUMENTS

| | | | |
|---|---|---|---|
| 7,206,613 B2 * | 4/2007 | Kim et al. ...................... 455/567 |
| 7,509,113 B2 * | 3/2009 | Knoedgen .................... 455/334 |
| 8,195,220 B2 * | 6/2012 | Kim et al. ................... 455/550.1 |
| 2001/0012792 A1 * | 8/2001 | Murray ......................... 455/567 |
| 2005/0063556 A1 * | 3/2005 | McEachen et al. ........... 381/104 |
| 2006/0290921 A1 * | 12/2006 | Hotelling et al. ........... 356/152.2 |
| 2007/0064961 A1 * | 3/2007 | Jiang et al. .................... 381/104 |
| 2008/0048878 A1 * | 2/2008 | Boillot ....................... 340/686.1 |
| 2008/0085014 A1 * | 4/2008 | Chen et al. .................... 381/105 |
| 2013/0094668 A1 * | 4/2013 | Poulsen et al. ................ 381/107 |

\* cited by examiner

*Primary Examiner* — Vivian Chin
*Assistant Examiner* — Jason R Kurr
(74) *Attorney, Agent, or Firm* — Novak Druce Connolly Bove + Quigg LLP

(57) ABSTRACT

An electronic device includes a volume adjustment activating module, a distance detection module, and an adjusting module. The volume adjustment activating module is configured for activating the distance detection module to measure distances between a volume adjusting member and the distance detection module. The distance detection module includes at least one distance sensor, the at least one distance sensor is configured for detecting distances between the volume adjusting member and the distance detection module to obtain a plurality of distance measure values. The adjusting module is configured to adjust a volume of the electronic device according to the distance measure values.

18 Claims, 9 Drawing Sheets

METHOD AND APPARATUS FOR ADJUSTING VOLUME USING DISTANCE SENSORS

BACKGROUND

1. Technical Field

The present disclosure relates to volume adjustment technology, and more particularly, to a method and an apparatus for adjusting volume using distance sensors.

2. Description of Related Art

Electronic devices, such as mobile phones, portable media players, computer monitors or televisions, normally adopt mechanical buttons for volume adjustment. When a user desires to adjust the volume of the electronic device, the user needs to manually press the mechanical button to turn up or turn down the volume.

However, this mechanical volume adjustment is inconvenient to the user. Specially, when the volume of the electronic device needs to be adjusted within a relative great range, the user may have to press the mechanical button many times. This not only brings inconvenience to the user, but also requires a long response time to finish the volume adjustment.

What is needed is to provide a means that can overcome the aforementioned limitations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe specific exemplary embodiments of the present disclosure in detail.

Figure 1:
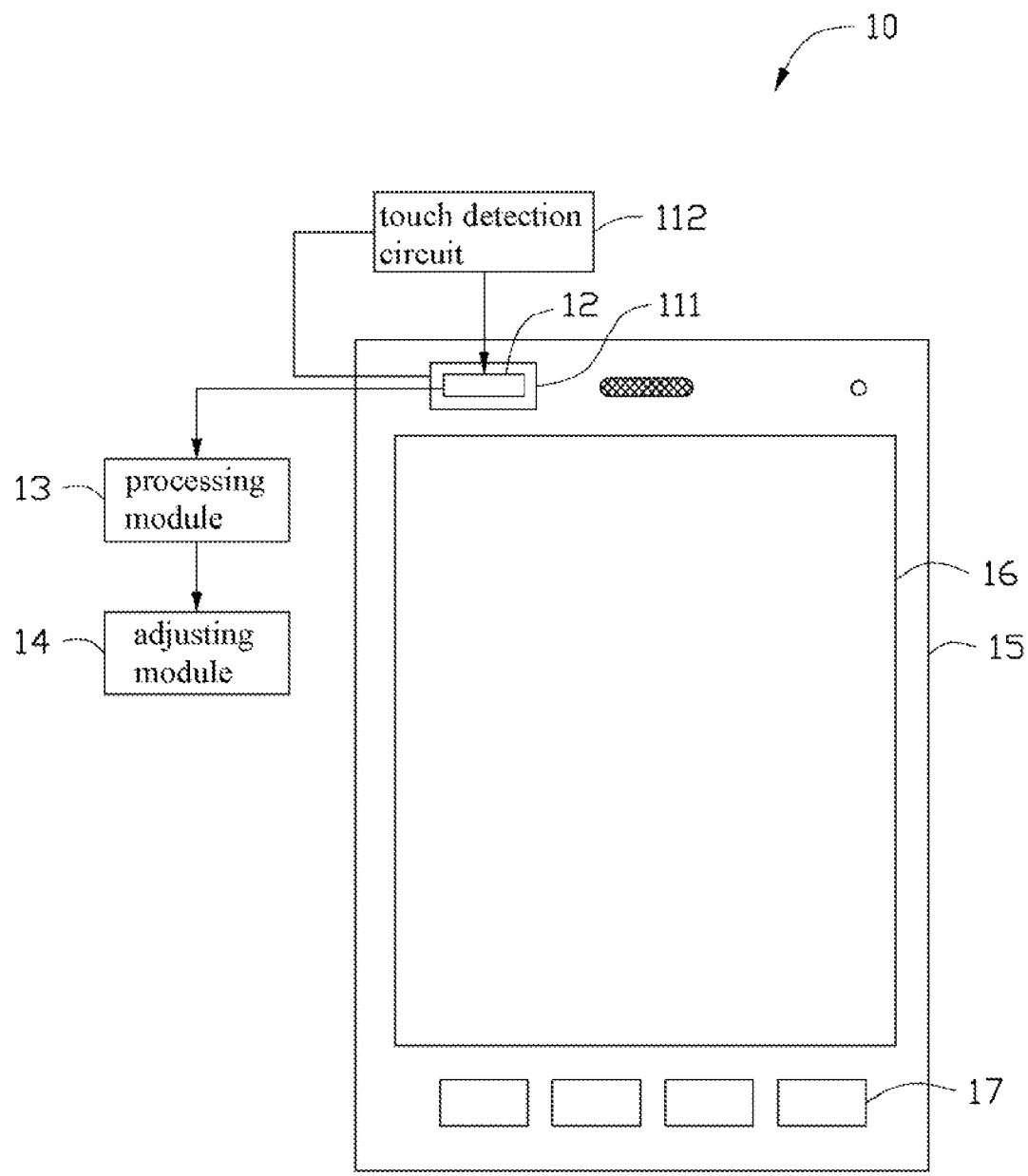
FIG. 1 schematically illustrates a planar view of an electronic device according to an embodiment of the present disclosure.

FIG. 1 schematically illustrates a planar view of an electronic device according to an embodiment of the present disclosure. The electronic device 10 may be a mobile phone, a laptop computer, a computer monitor, or a television, for example. The electronic device 10 includes a panel 15, a touch sense unit 111, a touch detection circuit 112, a distance detection module 12, a processing module 13, and an adjusting module 14.

Figure 2:
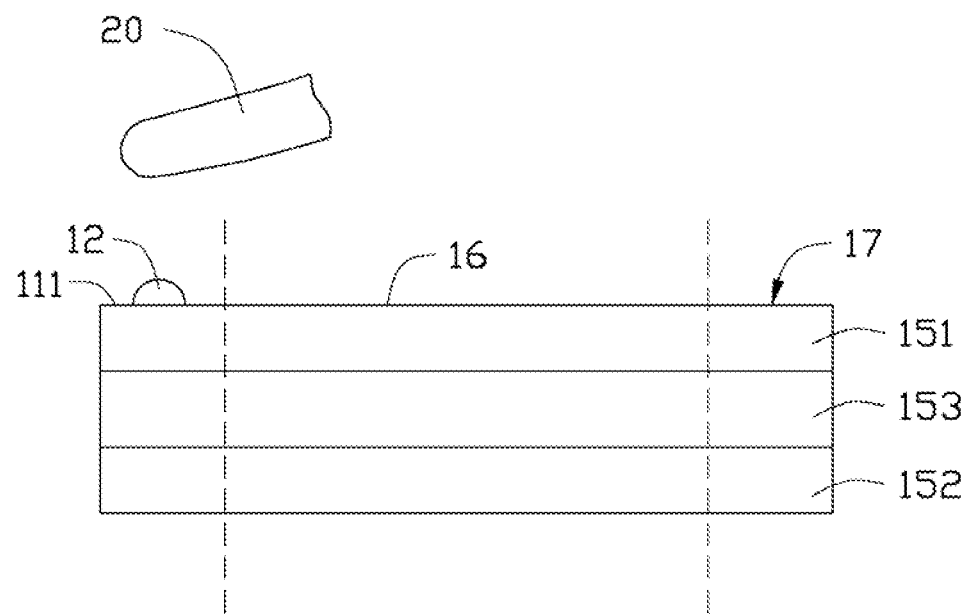
FIG. 2 schematically illustrates a side view of the electronic device of FIG. 1.

The panel 15 may be a touch panel such as a resistance touch panel or a capacitance touch panel. Referring also to FIG. 2, the panel 15 includes a first conductor layer 151, a second conductor layer 152 opposite to the first conductor layer 151, and a touch sense layer 153 sandwiched between the first conductor layer 151 and the second conductor layer 152. The touch sense layer 153 may be a dielectric layer when the panel 15 is the capacitance type touch panel, or a gap layer when the panel 15 is the resistance type touch panel.

A main central region of the panel 15 is defined as a display area 16 for displaying images, and a peripheral region surrounding the display area 16 is defined as a non-display area (not labeled). A plurality of function keys 17 are disposed on the non-display area on the first conductor layer 151 and are adjacent to a side of the display area 16. The touch sense unit 111 is also disposed on the non-display area but is adjacent to an opposite side of the display area 16. The touch sense unit 111 provides an activating interface for a user such that the user can provide a touch action on the touch sense unit 111 (e.g., touching the touch sense unit 111 either by one or more fingers or a stylus).

The touch detection circuit 112 is electrically connected to the touch sense unit 111, and the touch detection circuit 112 is configured for detecting the touch action applied to the touch sense unit 111 and providing an activation signal to activate the distance detection module 12 when the touch action applied on the touch sense unit 111 is detected.

The distance detection module 12 may be an infrared (IR) detection module including at least one distance sensor such as an IR distance sensor, and can be integrated with the touch sense unit 111. The at least one distance sensor measures a distance between an volume adjusting member 20 (e.g., a finger of the user or a touch pen) and provides the distance measure values to the processing module 13.

The processing module 13 and the adjusting module 14 may both be configured within a processor. The processing module 13 pre-stores a plurality of distance reference values x1, x2, x3, . . . xn, each of the distance reference values corresponds to a respective distance indicator. The processing module 13 may compare the distance measure values with the pre-stored distance reference values x1, x2, x3, . . . xn. When a difference between a distance measure value and a distance reference value xi is less than a predetermined threshold, the processing module 13 selects the distance reference value xi as a distance indicator for representing the distance measure value. That is, the processing module 13 may convert the plurality of distance measure values into a sequence of distance indicators. The processing module 13 may further generate a volume adjustment control signal according to the distance indicators and output the volume adjustment control signal to the adjusting module 14, so as to control the adjusting module 14 to adjust the volume of the electronic device 10.

Figure 3:
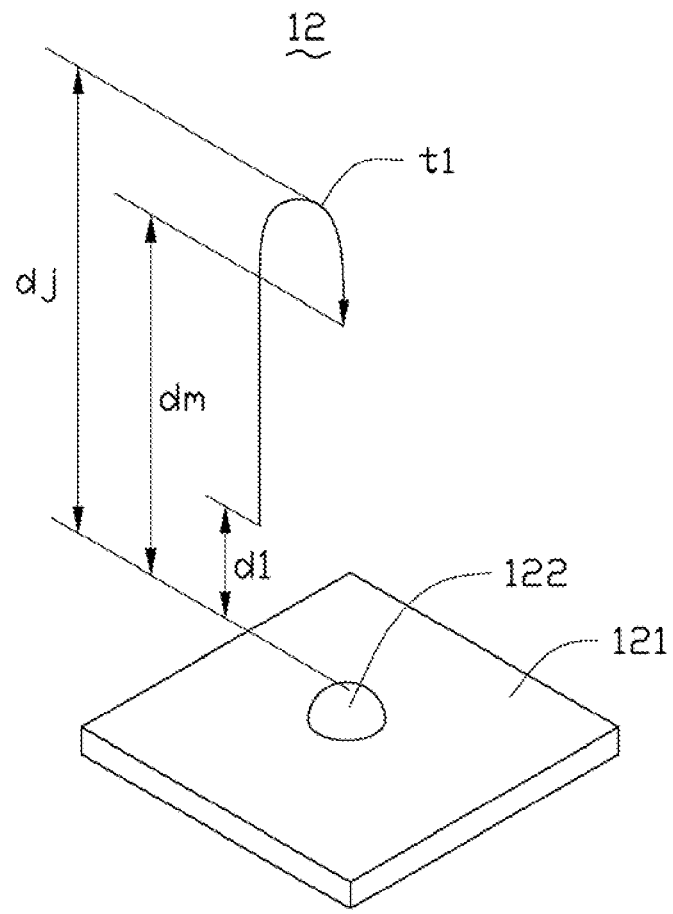
FIG. 3 schematically illustrates volume adjustment in the electronic device of FIG. 1 by using a distance sensor according to a first embodiment of the present disclosure.

Referring to FIG. 3, in a first embodiment, the distance detection module 12 includes a base 121 and a distance sensor 122 disposed on the base 121. After the distance detection module 12 is activated, the user may manipulate the volume adjusting member 20 (such as a finger of the user or a touch pen) to control the electronic device 10 to perform volume adjustment. For example, when the volume adjusting member 20 is moved above the distance sensor 122, the distance sensor 122 may measure a distance between the volume adjusting member 20 and the distance sensor 122 in real-time, and obtain a plurality of distance measure values d1, d2, d3, ..., dm corresponding to the movement of the volume adjusting member 20.

The distance measure values d1, d2, d3, ..., dm can further be outputted to the processing module 13, where the processing module 13 converts the distance measure values d1, d2, d3, ..., dm into corresponding distance indicators. The processing module 13 analyzes the movement of the volume adjusting member 20 using the distance indicators to determine if the movement of the volume adjusting member 20 matches a predetermined track. If the movement of the volume adjusting member 20 matches the predetermined track, the processing module 13 generates a volume adjustment control signal based on the predetermined track, and outputs the volume adjustment control signal to the adjusting module 14. The adjusting module 14 further adjusts the volume of the electronic device 10 according to the volume adjustment control signal.

For example, the predetermined track may be set as t1 in FIG. 3, which includes a first part with a first direction substantially vertically away from the distance sensor 122, and a second part with a second direction substantially reverse to the first direction (i.e., a direction substantially vertically towards the distance sensor 122).

When values of the distance indicators obtained by the processing module 13 first increase gradually (i.e., being in an upward tendency) to a maximum value, then the values decrease gradually (i.e., changing to a downward tendency), the movement of the volume adjusting member 20 matches the predetermined track. For example, as shown in FIG. 3, the volume adjusting member 20 moves from a start point that has a first distance d1 from the distance sensor 122, then moves to an intermediate point that has a maximum distance dj from the distance sensor 122. The movement of the volume adjusting member 20 may stop at an end point that has a distance dm from the distance sensor 122. With this movement, a sequence of distance indicators as described above (i.e., first increase gradually, then decrease gradually) can be obtained.

Therefore, the processing module 13 may determine that a valid volume adjusting action is applied to the electronic device 10 by the user. The processing module 13 selects a last one of the distance indicators that corresponds to the last distance measure value (i.e., dm), generates a volume adjustment control signal in accordance with the last distance indicator, and outputs the volume adjustment control signal to the adjusting module 14. The adjusting module 14 is thereby controlled to adjust the volume of the electronic device 10 to a desired value corresponding to the end point (corresponding to the last distance measure value dm) of the movement of the volume adjusting member 20.

Furthermore, based on the values of the distance indicators obtained by the processing module 13 first increasing gradually and then decreasing gradually, the processing module 13 may stop the distance detection module 12 from measuring distances, and the volume adjustment is finished. If the user needs to adjust the volume again, the user can provide a touch action on the touch sense unit 111 again to activate the volume adjustment of the electronic device 10.

As can be seen in the electronic device 10 as provided in the first embodiment, after the distance detection module 12 is activated, the user can adjust the volume of the electronic device 10 in a non-contact adjustment manner, such non-contact adjustment manner makes it be possible for the electronic device 10 to adjust the volume to a desired value by using a one-time volume adjustment process. This is convenient for the user, and can also reduce a response time of the volume adjustment.

Figure 4:
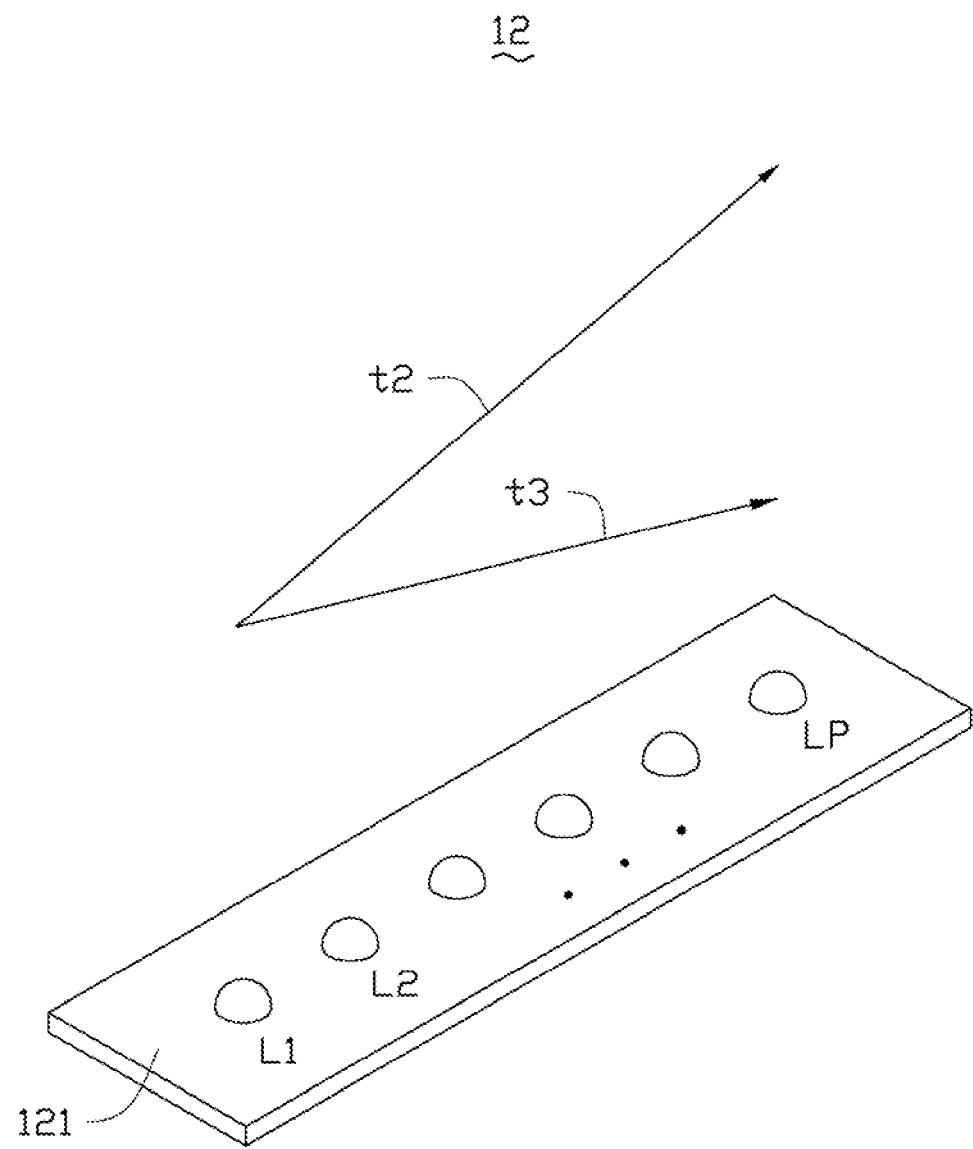
FIG. 4 schematically illustrates volume adjustment in the electronic device of FIG. 1 by using distance sensors according to a second embodiment of the present disclosure.

Referring to FIG. 4, in a second embodiment, the distance detection module 12 includes a base 121 and a plurality of distance sensors L1, L2, ... Lp disposed on the base 121. The base 121 has an elongated shape and the plurality of distance sensors L1, L2, ... Lp are arranged in a line along the elongated base 121. In the embodiment of FIG. 4, the processing module 13 may control the adjusting module 14 to increase the volume of the electronic device 10 based on a first predetermined track, and decrease the volume of the electronic device 10 based on a second predetermined track. The first predetermined track may be set as moving in a direction along the arrangement of the distance sensors L1-Lp in such a manner that distances between the volume adjusting member 20 and the distance sensors L1-Lp increase gradually, as t2 in FIG. 4; the second predetermined track may be set as moving in a direction along the arrangement of the distance sensors L1-Lp in such a manner that distances between the volume adjusting member 20 and the distance sensors L1-Lp decrease gradually, as t3 in FIG. 4.

When the volume adjusting member 20 moves above the distance detection module 12 and in a direction along the arrangement of the distance sensors L1-Lp, the plurality of distance sensors L1-Lp output a sequence of distance measure values d1, d2, ... dp to the processing module 13, and the processing module 13 converts the sequence of distance measure values d1, d2, ... dp into a sequence of distance indicators. If the processing module 13 obtains a sequence of distance indicators whose values increase gradually (i.e., being in an upward tendency), the movement of the volume adjusting member 20 matches the first predetermined track and thus it can also be determined that a valid volume adjusting action corresponding to turning up the volume is applied to the electronic device 10 by the user. Accordingly the processing module 13 may generate a first volume adjustment control signal, and output the first volume adjustment control signal to the adjusting module 14. The adjusting module 14 is thereby controlled to turn up the volume of the electronic device 10.

If the processing module 13 obtains a sequence of distance indicators whose values decrease gradually (i.e., being in an downward tendency), the movement of the volume adjusting member 20 matches the second predetermined track and thus it can also be determined that a valid volume adjusting action corresponding to turning down the volume is applied to the electronic device 10 by the user. Accordingly the processing module 13 may generate a second volume adjustment control signal, and output the second volume adjustment control signal to the adjusting module 14. The adjusting module 14 is thereby controlled to turn down the volume of the electronic device 10.

In practice, an increment or a decrement of the volume may be relevant to a last distance measure value obtained by the last distance sensor Lp or a last distance indicator corresponding to last distance measure value. Alternatively, the increment or decrement of the volume may also be relevant to an average value of the distance measure values d1, d2, ... dp or an average value of the corresponding distance indicators, or be relevant to a time period from a first distance measure value obtained by a first distance sensor L1 to a last distance measure value obtained by a last distance sensor Lp.

Figure 5:
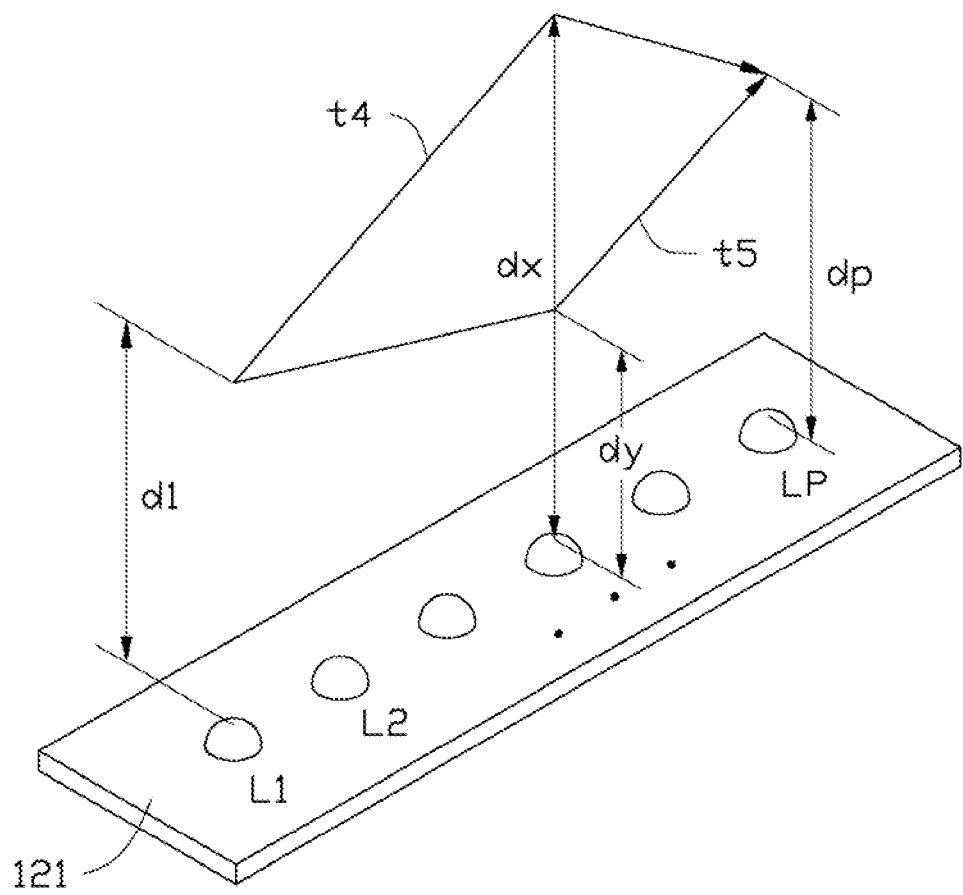
FIG. 5 schematically illustrates volume adjustment in the electronic device of FIG. 1 by using distance sensors according to a third embodiment of the present disclosure.

Referring to FIG. 5, in a third embodiment, the distance detection module 12 may have the configuration as illustrated in FIG. 4. In the embodiment of FIG. 5, the processing module 13 may control the adjusting module 14 to increase the volume of the electronic device 10 based on a first predetermined track, and decrease the volume of the electronic device 10 based on a second predetermined track. However, differing from the embodiment of FIG. 4, in the embodiment of FIG. 5, the first predetermined track may be set as moving in a direction along the arrangement of the distance sensors L1-Lp in such a manner that distances between the volume adjusting member 20 and the distance sensors L1-Lp firstly increase until to a maximum value and then change to decrease, as t4 in FIG. 5; the second predetermined track may be set as moving in a direction along the arrangement of the distance sensors L1-Lp in such a manner that distances between the volume adjusting member 20 and the distance sensors L1-Lp firstly decrease until to a minimum value and then change to increase, as t5 in FIG. 5.

Similarly to the embodiment of FIG. 4, when the volume adjusting member 20 moves above the distance detection module 12 and in a direction along the arrangement of the distance sensors L1-Lp, the plurality of distance sensors L1-Lp would output a sequence of distance measure values d1, d2, . . . dp to the processing module 13, and the processing module 13 converts the sequence of distance measure values d1, d2, . . . dp into a sequence of distance indicators.

If values of the sequence of distance indicators obtained by the processing module 13 first increase gradually to the maximum value, and then the values decrease gradually, the movement of the volume adjusting member 20 matches the first predetermined track and thus it can also be determined that a valid volume adjusting action corresponding to turning up the volume is applied to the electronic device 10 by the user.

If values of the sequence of distance indicators obtained by the processing module 13 first decrease gradually to the minimum value, and then the values increase gradually, it is indicated that the movement of the volume adjusting member 20 matches the second predetermined track and thus it can also be determined that a valid volume adjusting action corresponding to turning down the volume is applied to the electronic device 10 by the user.

Furthermore, based on the values of the distance indicators obtained by the processing module 13 firstly increasing/decreasing gradually and then decreasing/increasing gradually, the processing module 13 may further control the distance detection module 12 to stop measuring distances, and the volume adjustment is finished. If the user needs to adjust the volume again, the user can further provide a touch action to the touch sense unit 111 and then activate the volume adjustment of the electronic device 10.

Figure 6:
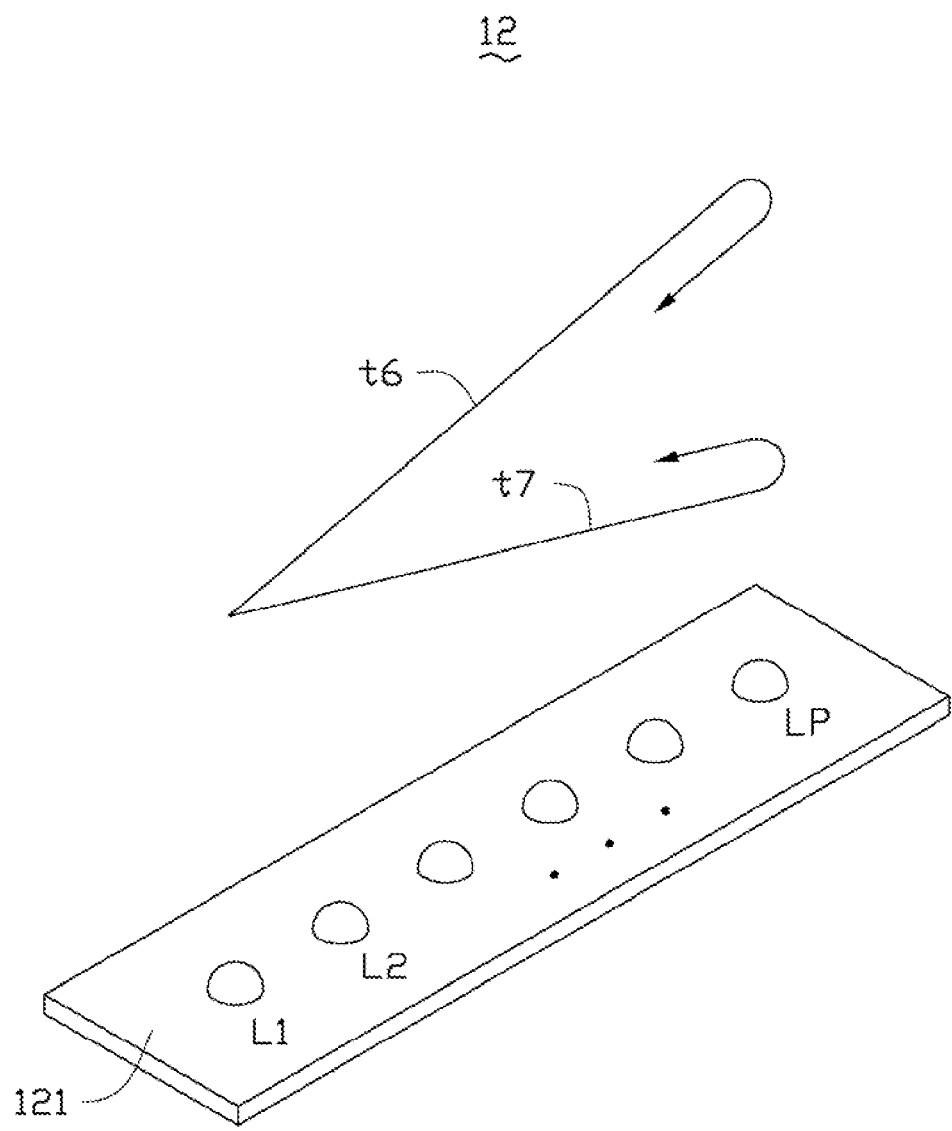
FIG. 6 schematically illustrates volume adjustment in the electronic device of FIG. 1 by using distance sensors according to a fourth embodiment of the present disclosure.

Referring to FIG. 6, in a fourth embodiment, the distance detection module 12 may have the configuration as illustrated in FIG. 5. In the embodiment of FIG. 6, the processing module 13 may also control the adjusting module 14 to increase the volume of the electronic device 10 based on a first predetermined track, and decrease the volume of the electronic device 10 based on a second predetermined track. However, differing from the embodiment of FIG. 5, in the embodiment of FIG. 6, the first predetermined track may be set as moving in a first direction along the arrangement of the distance sensors L1-Lp in such a manner that distances between the volume adjusting member 20 and the distance sensors L1-Lp increase, and then the movement changes to an opposite second direction, as t6 in FIG. 6; the second predetermined track may be set as moving in the first direction along the arrangement of the distance sensors L1-Lp in such a manner that distances between the volume adjusting member 20 and the distance sensors L1-Lp decrease, and then the movement changes to the opposite second direction, as t7 in FIG. 6.

When the volume adjusting member 20 moves above the distance detection module 12 and in the first direction along the arrangement of the distance sensors L1-Lp and then changes to the opposite second direction, the plurality of distance sensors L1-Lp would output a sequence of distance measure values d1, d2, . . . dp, d'p−1, . . . d'i to the processing module 13, and the processing module 13 converts the sequence of distance measure values d1, d2, . . . dp, d'p−1, . . . d'i into a sequence of distance indicators.

If the number of the measure values is greater than the number of the distance sensors L1, L2, . . . Lp (which indicates some distance sensors may detect the volume adjusting member 20 twice), and values of the sequence of distance indicators obtained by the processing module 13 firstly increase gradually (i.e., being in an upward tendency) to a maximum value, and then the values decrease gradually (i.e., changing to a downward tendency), it is indicated that the movement of the volume adjusting member 20 matches the first predetermined track. Thus, it can also be determined that a valid volume adjusting action corresponding to turning up the volume is applied to the electronic device 10 by the user. Accordingly the processing module 13 may control the adjusting module 14 to turn up the volume of the electronic device 10.

If the number of the measure values is greater than the number of the distance sensors L1-Lp, and values of the sequence of distance indicators obtained by the processing module 13 firstly decrease gradually (i.e., being in an downward tendency) to a minimum value, and then the values increase gradually (i.e., changing to a upward tendency), it is indicated that the movement of the volume adjusting member 20 matches the second predetermined track and thus it can also be determined that a valid volume adjusting action corresponding to turning down the volume is applied to the electronic device 10 by the user. Accordingly the processing module 13 may control the adjusting module 14 to turn down the volume of the electronic device 10.

In practice, an increment or a decrement of the volume may be relevant to an average value of distance measure values d1, d2, . . . dp (i.e., the distance measure values d'p−1, . . . d'i which are obtained when the volume adjusting member 20 move in the second direction are discarded) or an average value of the corresponding distance indicators, or be relevant to a time period from a first distance measure value obtained by a first distance sensor L1 to a pth distance measure value obtained by a last distance sensor Lp. In other embodiments, the increment or decrement of the volume may also be configured as a fixed value.

Furthermore, based on the values of the distance indicators obtained by the processing module 13 firstly increasing gradually and then decreasing gradually, the processing module 13 may further control the distance detection module 12 to stop measuring distances, and the volume adjustment is finished. If the user needs to adjust the volume again, the user can further provide a touch action to the touch sense unit 111 and then activate the volume adjustment of the electronic device 10.

Figure 7:
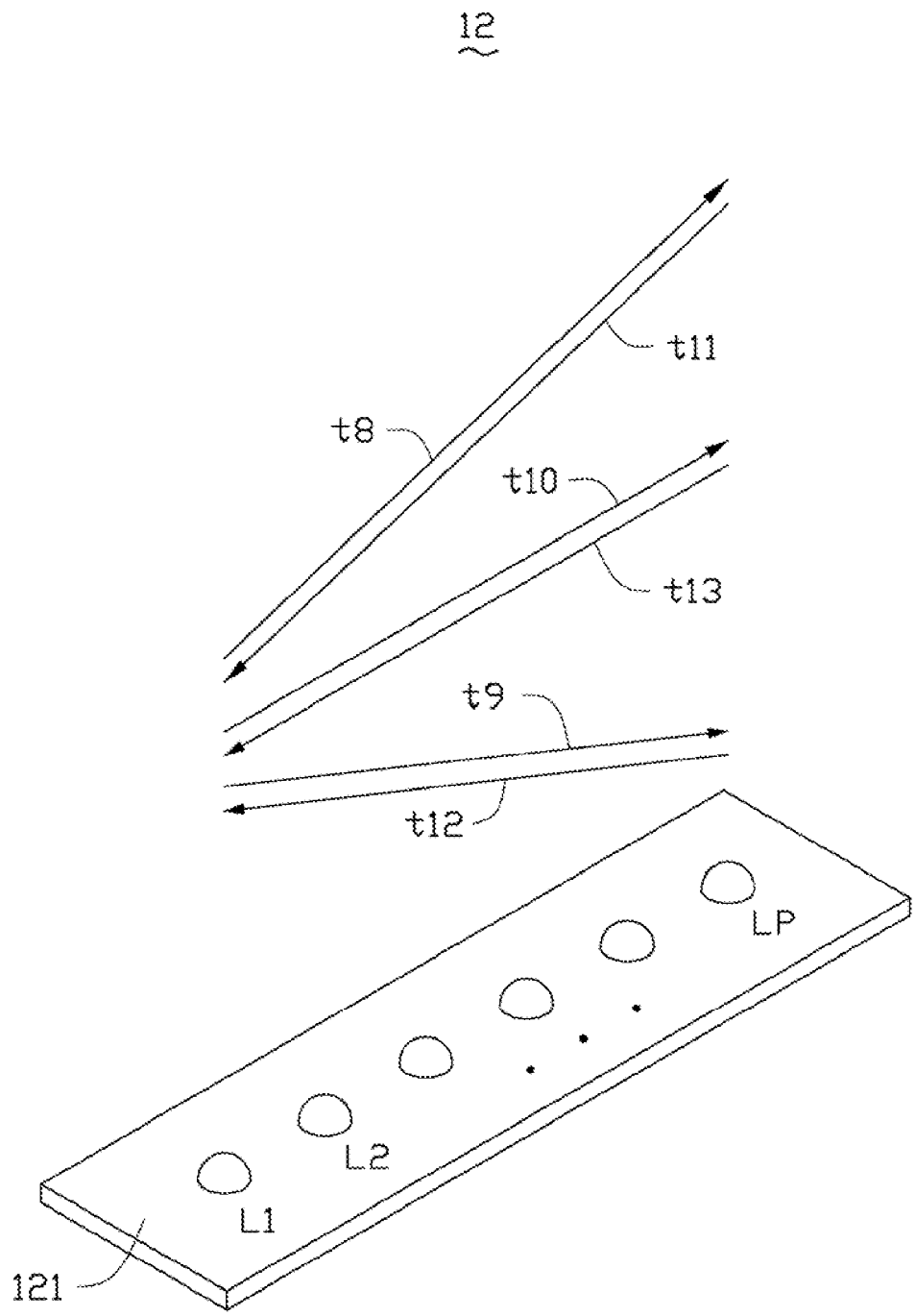
FIG. 7 schematically illustrates volume adjustment in the electronic device of FIG. 1 by using distance sensors according to a fifth embodiment of the present disclosure.

Referring to FIG. 7, in a fifth embodiment, the distance detection module 12 may has the configuration as illustrated in FIG. 4. In the embodiment of FIG. 7, the processing module 13 may control the adjusting module 14 to increase the volume of the electronic device 10 based on a first predetermined track, and decrease the volume of the electronic device 10 based on a second predetermined track. However, differing from the embodiment of FIG. 4, in the embodiment of FIG. 7, the first predetermined track may be set as moving in a first direction along the arrangement of the distance sensors from L1 to Lp, as t8-t10 in FIG. 7; the second predetermined track may be set as moving in a second direction along contrary arrangement of the distance sensors i.e., from Lp to L1, as t11-t13 in FIG. 7.

Similarly to the embodiment of FIG. 4, when the volume adjusting member 20 moves above the distance detection module 12 and in the first direction along the arrangement of the distance sensors L1-Lp, the plurality of distance sensors L1-Lp would output a sequence of distance measure values d1, d2, . . . dp to the processing module 13, and the processing module 13 converts the sequence of distance measure values d1, d2, . . . dp into a sequence of distance indicators. When the volume adjusting member 20 moves above the distance detection module 12 and in the second direction along the arrangement of the distance sensors from Lp to L1, the plurality of distance sensors Lp, Lp−1, . . . L1 would output a sequence of distance measure values d'p, d'p−1, . . . d'1 to the processing module 13, and the processing module 13 converts the sequence of distance measure values d'p, d'p−1, . . . d'1 into a sequence of distance indicators.

If the processing module 13 obtains a plurality of distance indicators in a sequence consistent with an arrangement of the distance sensors from L1 to Lp, it is indicated that the movement of the volume adjusting member 20 matches the first predetermined track and thus it can also be determined that a valid volume adjusting action corresponding to turning up the volume is applied to the electronic device 10 by the user. Accordingly the processing module 13 may control the adjusting module 14 to turn up the volume of the electronic device 10.

If the processing module 13 obtains a plurality of distance indicators in a sequence consistent with a contrary arrangement of the distance sensors from Lp to L1, it is indicated that the movement of the volume adjusting member 20 matches the second predetermined track and thus it can also be determined that a valid volume adjusting action corresponding to turning down the volume is applied to the electronic device 10 by the user. Accordingly the processing module 13 may control the adjusting module 14 to turn down the volume of the electronic device 10.

In practice, an increment of the volume may be relevant to an average value of the distance measure values d1, d2, . . . dp or an average of the corresponding distance indicators, or be relevant to a time period from a first distance measure value obtained by a first distance sensor L1 to a last distance measure value obtained by a last distance sensor Lp. A decrement of the volume may be relevant to an average value of the distance measure values d'p, d'p−1, . . . d'1 or an average of the corresponding distance indicators, or be relevant to a time period from a first distance measure value obtained by the last distance sensor Lp to a last distance measure value obtained by the first distance sensor L1. In other embodiments, the increment or decrement of the volume may also be configured as a fixed value.

Figure 8:
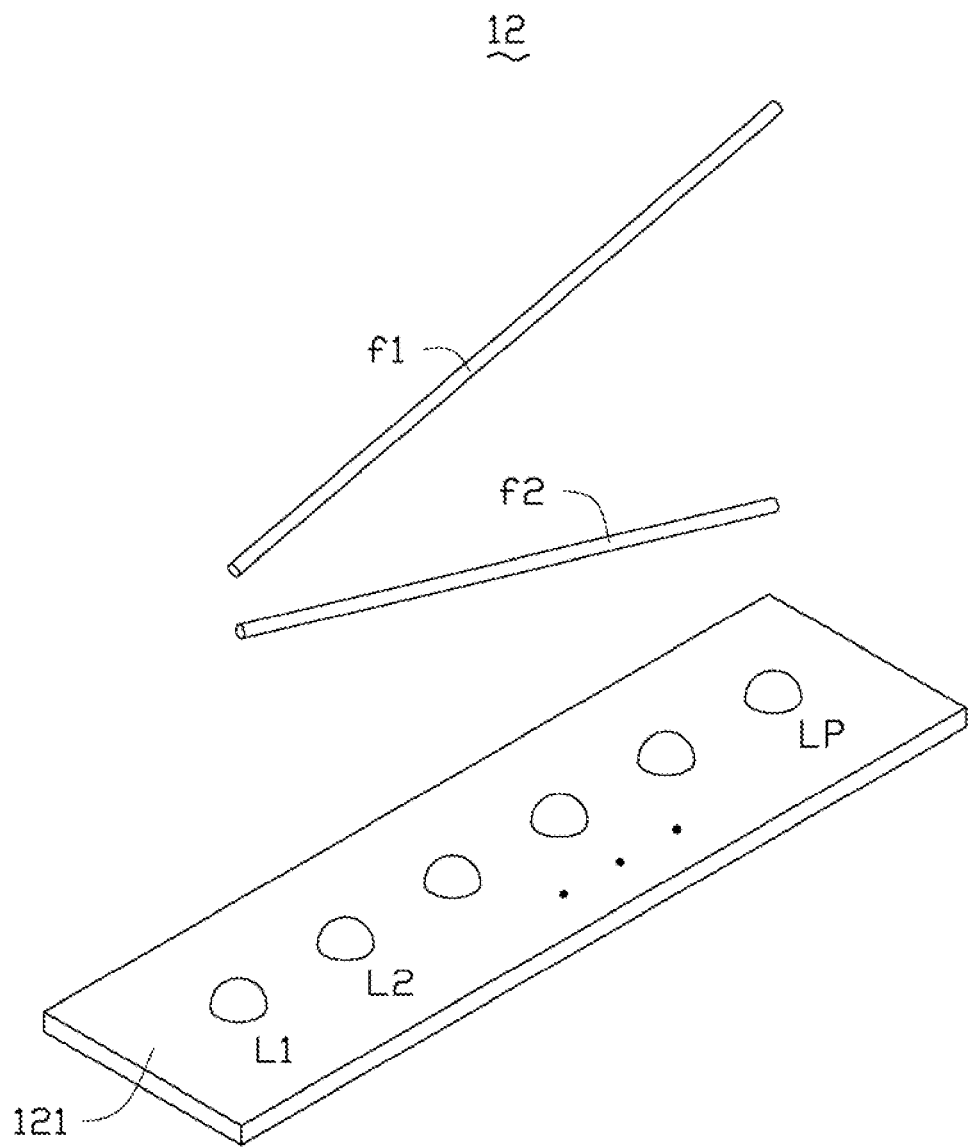
FIG. 8 schematically illustrates volume adjustment in the electronic device of FIG. 1 by using distance sensors according to a sixth embodiment of the present disclosure.

Referring to FIG. 8, in a sixth embodiment, the distance detection module 12 may has a configuration as illustrated in FIG. 4. However, in the embodiment of FIG. 8, the volume adjusting member 20 may have an elongated shape, and the user may adjust the volume of the electronic device 10 by placing the volume adjusting member 20 at a predetermined position above the distance detection module 12.

For example, when the user desires to turn up the volume of the electronic device 10, the volume adjusting member 20 may be placed at a first position as f1 in FIG. 8, in which a projection of the volume adjusting member 20 covers the distance sensors L1-Lp and distances between the volume adjusting member 20 and the distance sensors L1-Lp increase gradually; when the user desires to turn down the volume of the electronic device 10, the volume adjusting member 20 may be placed at a second position as f2 in FIG. 8, in which a projection of the volume adjusting member 20 covers the distance sensors L1-Lp and distances between the volume adjusting member 20 and the distance sensors L1-Lp decrease gradually.

Correspondingly, when the volume adjusting member 20 is placed at the first position f1 or the second position f2, the plurality of distance sensors L1-Lp output a sequence of distance measure values d1, d2, . . . dp to the processing module 13 at the same time, and the processing module 13 converts the sequence of distance measure values d1, d2, . . . dp into a sequence of distance indicators.

If the processing module 13 obtains a sequence of distance indicators whose values increase gradually, it is indicated that the volume adjusting member 20 is positioned at the first predetermined position and thus it can also be determined that a valid volume adjusting action corresponding to turning up the volume is applied to the electronic device 10 by the user. Accordingly the processing module 13 may control the adjusting module 14 to turn up the volume of the electronic device 10.

If the processing module 13 obtains a sequence of distance indicators whose values decrease gradually, it is indicated that the volume adjusting member 20 is positioned at the second predetermined position and thus it can also be determined that a valid volume adjusting action corresponding to turning down the volume is applied to the electronic device 10 by the user. Accordingly the processing module 13 may control the adjusting module 14 to turn down the volume of the electronic device 10.

In practice, an increment or a decrement of the volume may be relevant to an average value of the distance measure values d1, d2, . . . dp or an average value of the corresponding distance indicators.

Figure 9:
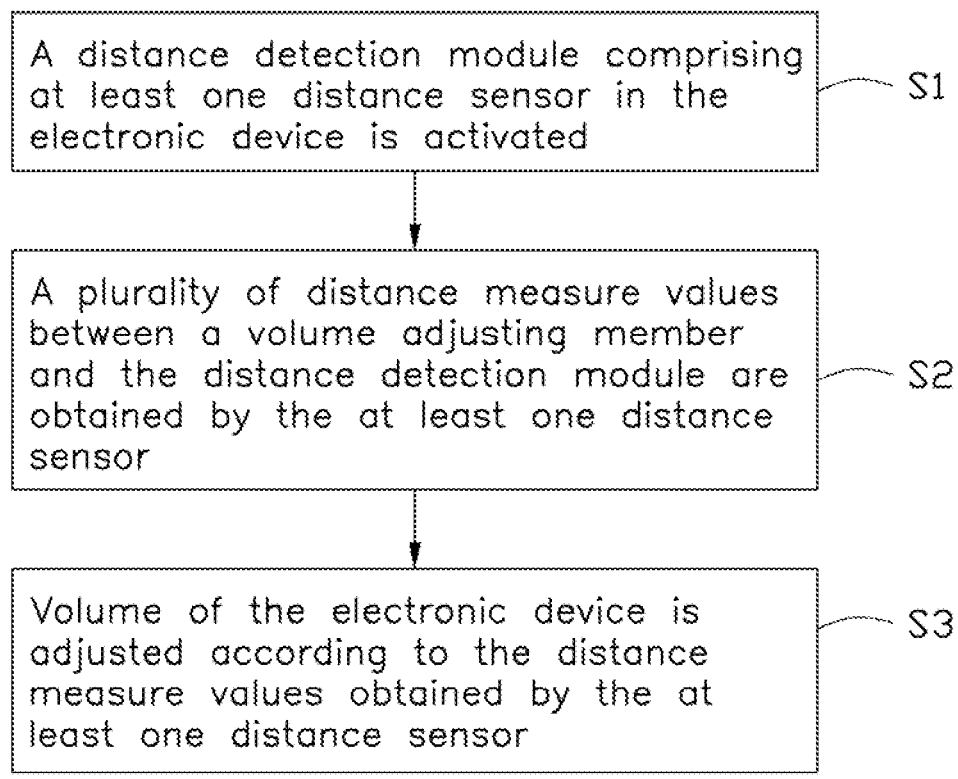
FIG. 9 is a flowchart of a method for adjusting volume in an electronic device according to an embodiment of the present disclosure.

Based on the above-described electronic device 10 with the distance detection module 12, the present disclosure further provides a method for adjusting volume of an electronic device. The method can be implemented in the electronic device 10 as illustrated in FIG. 1 which adopts any one of distance detection module 12 as illustrated in FIGS. 3-8. Referring to FIG. 9, the method includes:

Step S1, a distance detection module 12 including at least one distance sensor in the electronic device 10 is activated.

For example, when the distance detection module 12 has a configuration as illustrated in FIG. 3, a distance sensor disposed in a base is included in the distance detection module 12, when the distance detection module 12 has a configuration as illustrated in any one of FIGS. 4-8, a plurality of distance sensors disposed in a base are included in the distance detection module. Moreover, the distance detection module 12 may be activated by a touch sense unit and a touch detection circuit as illustrated in FIG. 1.

Step S2, a plurality of distance measure values between a volume adjusting member and the distance detection module 12 are obtained by the at least one distance sensor.

For example, when a user moves a volume adjusting member such as a touch pen or a finger above the at least one distance sensor, or places the volume adjusting member above the at least one distance sensor, to control the volume adjustment of the electronic device 10, the at least one distance sensor would detect the movement or a position of the volume adjusting member and correspondingly obtain a plurality of distance measure values during the movement of the volume adjusting member. The distance measure values may further be outputted to a processing module 13 in the electronic device 10.

Step S3, volume of the electronic device 10 is adjusted according to the distance measure values obtained by the at least one distance sensor.

For example, the processing module 13 may analyze a movement of the volume adjusting member or a position of the volume adjusting member, based on the distance measure values obtained by the at least one distance sensor. When the distance measure values indicate that the movement of the volume adjusting member matches a predetermined track, or indicate that the volume adjusting member is placed at a predetermined position, the processing module 13 may determine that a valid volume adjustment command is provided by the user through the volume adjusting member, and thus generating and outputting a corresponding volume adjustment control signal to an adjusting module 14 in the electronic device 10. The adjusting module 14 may further perform the volume adjustment of the electronic device 10 according to the volume adjustment control signal.

Details of steps S1-S3 can be reference to the operation of the distance detection module 12 as well as other related module in the electronic devices 10 as illustrated in FIGS. 1-8.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A method for adjusting a volume of an electronic device, comprising:
    activating a distance detection module in the electronic device to measure distances between a volume adjusting member and the distance detection module, the distance detection module comprising at least one distance sensor;
    obtaining, by the at least one distance sensor, a plurality of distance measure values between the volume adjusting member and the distance detection module;
    converting each of the distance measure values into a respective distance indicator and obtaining a sequence of distance indicators; wherein the plurality of distance measure values are converted into the respective distance indicator by:
    comparing the plurality of distance measure values with distance reference values pre-stored in the electronic device; and
    in response to finding a difference between a distance measure value and a distance reference value is less than a predetermined threshold, determining the distance reference value as a distance indicator corresponding to the distance measure value; and
    adjusting the volume of the electronic device according to the distance measure values obtained by the at least one distance sensor.

2. The method of claim 1, wherein the activating a distance detection module in the electronic device comprises:
    detecting a touch action applied on a touch sense unit of the electronic device; and
    activating the distance detection module when the touch action applied on the touch sense unit is detected.

3. The method of claim 1, wherein the adjusting the volume of the electronic device according to the distance measure values comprises:
    analyzing the sequence of the distance indicators to determine a movement of the volume adjusting member;
    determining whether the movement matches a predetermined track of a valid volume adjusting action; and
    if the movement matches a predetermined track of a valid volume adjusting action, turning up or turning down the volume of the electronic device by use of a volume adjustment control signal corresponding to the predetermined track.

4. The method of claim 3, wherein the at least one distance sensor comprises one distance sensor, and the predetermined track is set as moving in a first direction substantially vertically away from the at least one distance sensor, and then changing to a second direction substantially opposite to the first direction.

5. The method of claim 3, wherein the at least one distance sensor comprises a plurality of distance sensors arranged in a line, and the predetermined track comprises a first predetermined track corresponding to an increase of volume and a second predetermined track corresponding to a decrease of volume.

6. The method of claim 5, wherein the first predetermined track is set as the volume adjusting member moving in a direction along an arrangement of the distance sensors in such a manner that distances between the volume adjusting member and the distance sensors increase gradually; and the second predetermined track is set as moving in the direction along the arrangement of the distance sensors in such a manner that distances between the volume adjusting member and the distance sensors decrease gradually.

7. The method of claim 5, wherein the first predetermined track is set as moving in a direction along an arrangement of the distance sensors in such a manner that distances between the volume adjusting member and the distance sensors firstly increase gradually until to a maximum value and then change to decrease gradually; the second predetermined track is set as moving in the direction along the arrangement of the distance sensors in such a manner that distances between the volume adjusting member and the distance sensors firstly decrease gradually until to a minimum value and then change to increase gradually.

8. The method of claim 5, wherein the first predetermined track is set as moving in a first direction along an arrangement of the distance sensors in such a manner that distances between the volume adjusting member and the distance sensors increase, and then the movement changes to an opposite second direction; the second predetermined track may be set as moving in the first direction along the arrangement of the distance sensors in such a manner that distances between the volume adjusting member and the distance sensors decrease, and then the movement changes to the opposite second direction.

9. The method of claim 5, wherein the first predetermined track is set as moving in a first direction along an arrangement of the distance sensors; the second predetermined track may be set as moving in a second direction along a contrary arrangement of the distance sensors.

10. The method of claim 1, wherein the at least one distance sensor comprises a plurality of distance sensors arranged in a line, and the adjusting the volume of the electronic device according to the distance measure values comprises:
    analyzing the sequence of the distance indicators to determine a position of the volume adjusting member;

determining whether the position of the volume adjusting member matches a predetermined position of a valid volume adjusting action; and if matches, turning up or turning down the volume of the electronic device by use of a volume adjustment control signal corresponding to the predetermined position.

11. The method of claim 10, wherein the predetermined position comprises a first predetermined position in which a projection of the volume adjusting member covers the distance sensors and distances between the volume adjusting member and the distance sensors increase gradually; and a second predetermined position in which a projection of the volume adjusting member covers the distance sensors and distances between the volume adjusting member and the distance sensors decrease gradually.

12. An electronic device, comprising a touch detection circuit, a distance detection module, and an adjusting module;

wherein the touch detection circuit activates the distance detection module to measure distances between a volume adjusting member and the distance detection module;

the distance detection module comprises at least one distance sensor, the at least one distance sensor is configured for detecting distances between the volume adjusting member and the distance detection module to obtain a plurality of distance measure values;

a processing module pre-storing a plurality of distance reference values, each of the distance reference values corresponds to a respective distance indicator, the processing module comparing the distance measure values with the pre-stored distance reference values and when a difference between a distance measure value and a distance reference value is less than a predetermined threshold, the processing module determines the distance reference value as a distance indicator for representing the distance measure value; and the adjusting module is configured to adjust a volume of the electronic device according to the distance measure values.

13. The electronic device of claim 12, wherein the volume adjustment activating module comprises:

a touch sense unit providing an activating interface for a user such that the user can provide a touch action on the touch sense unit; and a touch detection circuit electrically connected to the touch sense unit, the touch detection circuit detecting the touch action applied to the touch sense unit and providing an activation signal to activate the distance detection module when the touch action applied on the touch sense unit is detected.

14. The electronic device of claim 12, further comprising a processing module generating a volume adjustment control signal according to the distance measure values; wherein the adjusting module adjusts the volume of the electronic device according to the volume adjustment control signal.

15. The electronic device of claim 14, the processing module converting each of the distance measure values into a respective distance indicator and thereby obtain a sequence of distance indicators.

16. The electronic device of claim 15, wherein the processing module provides the volume adjustment control signal to the adjusting module upon determining that a movement of the volume adjustment member matches a predetermined track.

17. The electronic device of claim 15, wherein the processing module provides a first volume adjustment control signal to control the adjusting module to turn up the volume when the sequence of distance indicators indicates that a movement of the volume adjustment member matches a first predetermined track; and provides a second volume adjustment control signal to control the adjusting module to turn down the volume when the sequence of distance indicators indicates the movement of the volume adjustment member matches a second predetermined track.

18. The electronic device of claim 15, wherein the processing module provides a first volume adjustment control signal to control the adjusting module to turn up the volume when the sequence of distance indicators indicates that a position of the volume adjustment member matches a first predetermined position; and provides a second volume adjustment control signal to control the adjusting module to turn down the volume when the sequence of distance indicators indicates the position of the volume adjustment member matches a second predetermined position.

* * * * *